April 25, 1961     H. SCHAFFER     2,981,315
RESILIENT CHAIR

Filed June 15, 1956     6 Sheets-Sheet 1

INVENTOR.
Harvey Schaffer
BY Morris Spector
Atty.

April 25, 1961        H. SCHAFFER        2,981,315
RESILIENT CHAIR

Filed June 15, 1956        6 Sheets-Sheet 3

INVENTOR.
Harvey Schaffer
BY Morris Spector
atty.

April 25, 1961 H. SCHAFFER 2,981,315
RESILIENT CHAIR
Filed June 15, 1956 6 Sheets-Sheet 4

INVENTOR.
Harvey Schaffer
BY Morris Spector
atty.

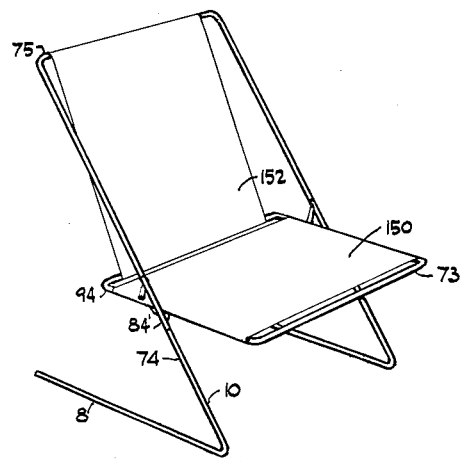
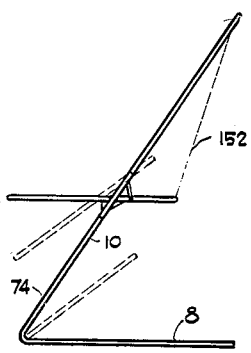
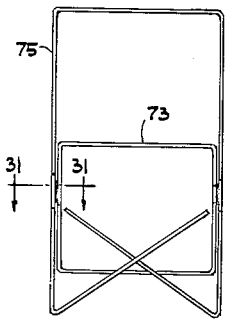
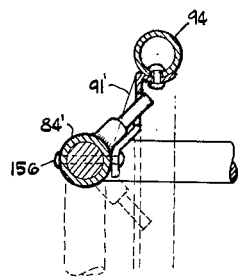
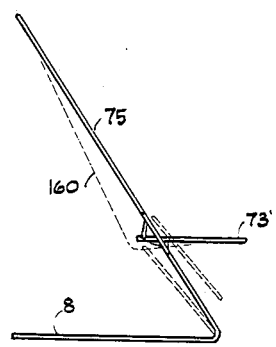
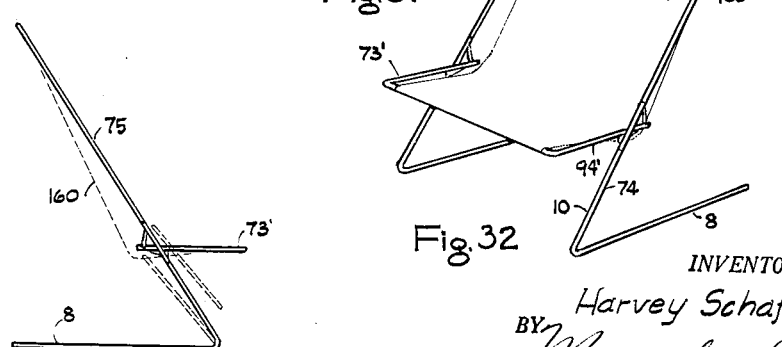

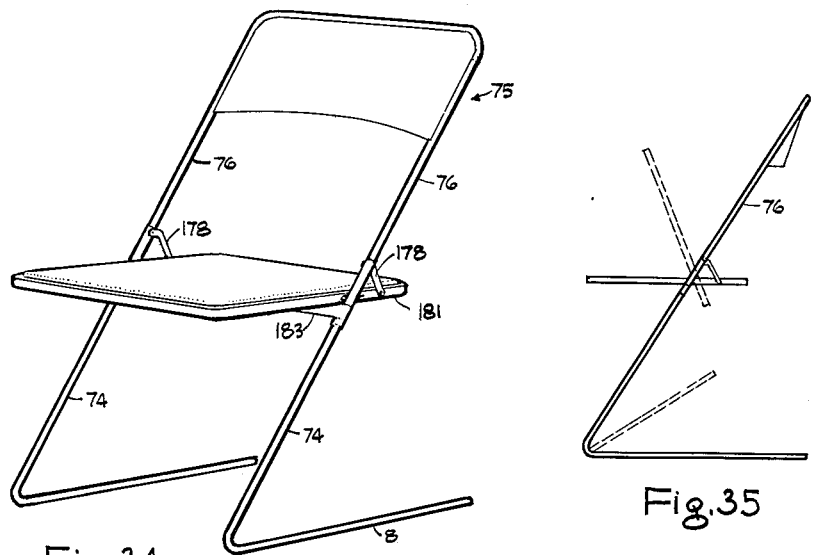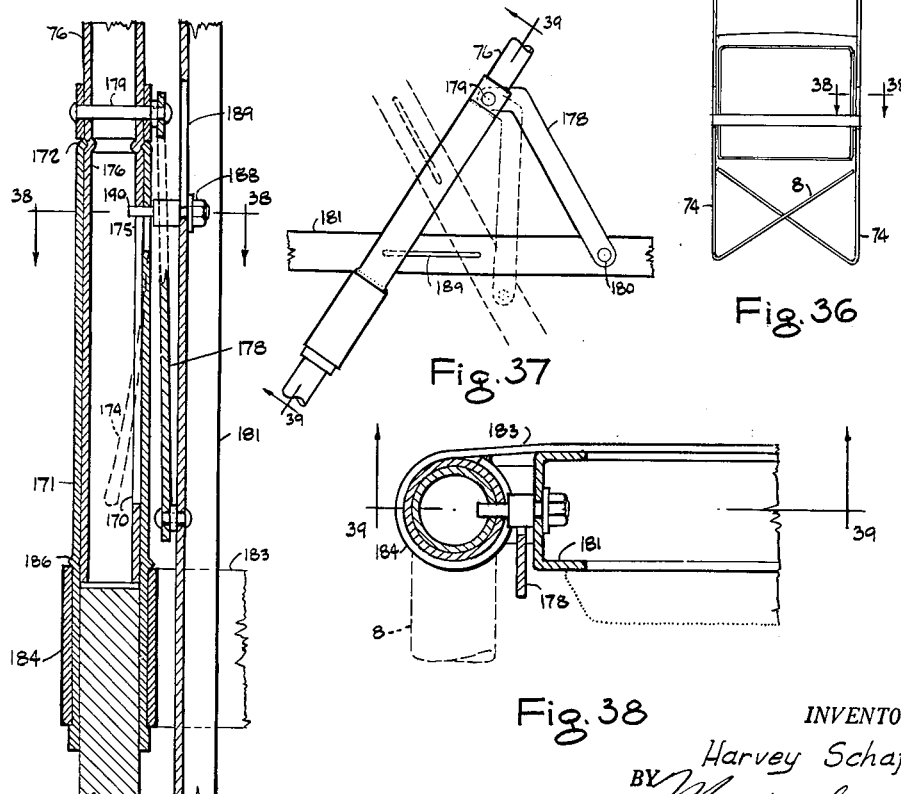

United States Patent Office 2,981,315
Patented Apr. 25, 1961

2,981,315
RESILIENT CHAIR
Harvey Schaffer, 1880 Blue Heights Drive,
Los Angeles, Calif.
Filed June 15, 1956, Ser. No. 591,589
2 Claims. (Cl. 155—54)

This application is a continuation in part of my co-pending application Serial No. 295,984, filed June 27, 1952, now U.S. Patent 2,865,439.

This invention relates to chairs, sofas and the like which are of the rocking or swaying type.

Resilient metal bases have heretofore been provided for chairs, including a base made of flexible metal or tubing, wherein the rocking action is obtained by the resiliency or flexing of the rod or tube of the base. It is with this type of chair frame that the present invention is primarily concerned.

It is one of the objects of the present invention to provide a chair of the above-mentioned character wherein the rocking or swaying action can be easily controlled by the occupant of the chair between maximum and minimum limits, and wherein the chair tends to be static on a neutral axis and permits increments of pendulum flexing increasing or decreasing from each position thereof, with a minimum amount of effort.

It is a further object of the present invention to provide a resilient frame for a chair seat wherein the flexing of the frame during the rocking or swaying motion is about two spaced, parallel axes that extend laterally of the chair, one of which is located adjacent to the floor level and the other of which is substantially above the first axis and only a small distance forward of the pivot between the thigh bone and the pelvis of the occupant of the chair when the occupant is in a normal position on the chair. The location is such as to produce a balance between the forward and rearward forces acting on the frame. The metal frame of the chair includes a substantially straight portion between the two pivot axes.

A flexible rod or tube that has been bent at an angle and is then subjected to bending stresses in such direction as to force the ends of the rod or tube toward or from one another tends to flex primarily at the bend, the intermediate portion remaining substantially unflexed. This principle is utilized in one embodiment of the present invention by providing a resilient chair frame with two bends separated by a straight portion. The desired back and forth motion is obtained by locating the seat, which may be of any preferred construction, in such a position on the base that the lower bend is close to the vertical plane of the front of the seat, although it may deviate from such location within wide limits, particularly to the rear of such vertical plane, and the upper bend is located rearwardly of the lower bend.

It is another object of the present invention to provide a seat frame which is so arranged and of such flexibility that the occupant of the seat can by exerting slight forward or rearward pressure on the seat cause flexing or tilting of the seat to the desired position, which it then retains with little effort on the part of the occupant of the seat. By supporting a seat from such a flexible rod or rod assembly the effect of the balanced force of the mass of the seat with the occupant thereon can be changed by the exertion by the occupant of slight forces against the back rest of the chair.

It is a still further object of the present invention to provide a seat frame of the above-mentioned character which is so constructed that even when it is built into a finished chair the frame may easily be stacked with other like frames for compactness in storage.

It is a still further object of the present invention to provide a chair of the above-mentioned character wherein the frame parts may be swiveled from an unfolded or utilization position to a folded position to facilitate storage or shipment of the chair.

It is a still further object of the present invention to provide a simple folding mechanism for folding chairs.

The attainment of the above and further objects of the present invention will be apparent from the following specification taken in conjunction with the accompanying drawings forming a part thereof.

In the drawings:

Fig. 28 is a perspective view illustrating another type of folding chair frame embodying the present invention;

Fig. 29 is a side view of the frame of Fig. 28 and showing, in dotted lines, the frame in its partially folded position;

Fig. 30 is a rear view of the frame of Fig. 29 in its folded position;

Fig. 31 is a sectional view, taken along the line 31—31 of Fig. 30, showing also, in dotted lines, the positions of certain parts when the chair is unfolded;

Fig. 32 is a perspective view of another type of folding chair embodying the present invention;

Fig. 33 is a side view of the chair of Fig. 32 and showing, in dotted lines, the position of the seat and the base as they approach folded positions;

Fig. 34 is a perspective view of another type of folding chair embodying the present invention;

Fig. 35 is a side view of the chair of Fig. 34 showing, in dotted lines, the chair in its partially folded position;

Fig. 36 is a rear view of the chair of Fig. 34 in its folded position;

Fig. 37 is an enlarged side view of the folding mechanism of the chair of Fig. 35, certain parts being shown also, in dotted lines, in their partially folded position;

Figure 1:
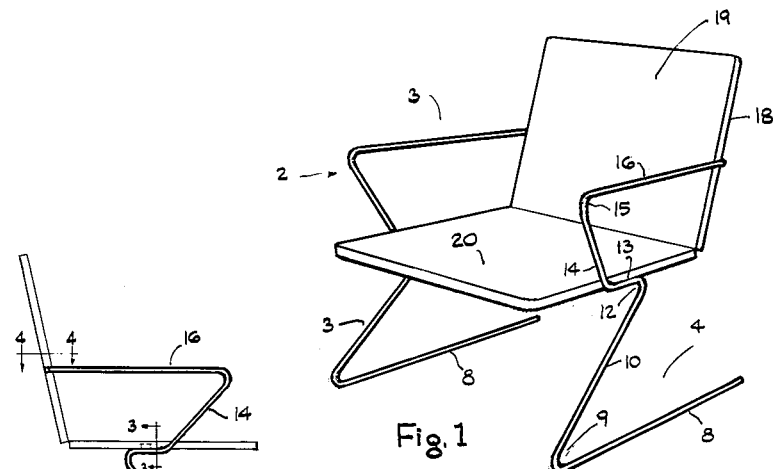
Fig. 1 is a front perspective view of a chair having a chair frame embodying the present invention.

Fig. 38 is an enlarged sectional view, taken along the line 38—38 of Fig. 36; and Fig. 39 is a sectional view, taken along the line 39—39 of Fig. 38, which is the same as a section on the line 39—39 of Fig. 37, with the parts in their folded position.

Reference may now be had more particularly to the drawings wherein like reference numerals designate like parts throughout.

In the various embodiments of the present invention herein illustrated the chair frame is, in each instance, made of resilient metal stock, such as tubing or rod stock.

The chair illustrated in Figs. 1 through 4 comprises a two piece frame 2 that is formed of flexible metal rod or tubing. The frame 2 has two similar parallel sides 3 and 4. Each side includes a floor-engaging runner 8 which at its forward end is bent along an acute angle 9 to provide an upwardly and rearwardly extending straight portion 10 which extends substantially the full height from the floor-engaging runner 8 to the chair seat, as will be hereinafter explained. At its upper end the portion 10 is bent forwardly at an acute angle 12 to provide a short forward extending portion 13 which is then bent upwardly and forwardly at 14 and then bent at 15 to form an arm rest 16. The arm 16 is secured in any desired manner, as by a bolt 17, to a rearwardly extending flange 18 of a metal chair back 19. The back 19 is secured at its lower end in any desired manner to a rectangular seat or seat support 20. One way of securing them is by an interlock that permits separation of the two when they are separated from the sides 3 and 4. The seat 20 has a downwardly extending peripheral flange 21, and is in turn secured to the forwardly extending portion 13 of the frame in any desired manner, for instance, that illustrated in Fig. 3, wherein an upward and sideways extending lug 22 is welded to the bent portion 13 and provides means for bolting the seat 20 to the frame part 13. The parts 19 and 20 are secured to the frame side 3 in the same manner as they are secured to the side 4.

The longitudinal axes of the floor-engaging runner 8 and the upwardly and rearwardly extending portion 10 and the portions 13, 14 and 16 of the side 3 are all in a vertical plane which is parallel to the vertical plane of the corresponding parts of the side 4. If desired, the plane of the longitudinal axes of the parts 8 and 10 on each side of the chair may be at an angle to the plane of the longitudinal axes of the parts 14 and 16 on the same side of the chair.

Each of the sides 3 and 4 of the chair frame of Fig. 1 may be easily disassembled from the seat and back rest, in each case by merely removing two bolts, and the seat and back rest may be juxtaposed. This facilitates shipping of the chair and renders the reassembly thereof quite simple. Where this feature is not of importance, the two frame sides 3 and 4 may constitute one continuous rod joined, for instance, at the rear of the two floor-engaging runners 8 or at the rear of the two arms 16—16 in back of the back 19.

The location of the seat and back rest unit with respect to the bends 9 and 12 is of importance. In the particular embodiments of the invention here illustrated, the front of the seat 20 is very slightly forward of a vertical plane through the bend 9, as may be seen in Fig. 2. The bend 12 is very close to the seat 20 and is rearward of the bend 9 and is so located that when a person sits on the chair the pivot between that person's thigh bone and pelvis is only a small distance from the center of flexing of the bend 12. When a person sits in the chair of Figs. 1 and 2 he can, by exerting slight pressure against the back rest 19, cause flexing of each of the sides 3 and 4 and consequent tilting of the seat and back rest, and yet be in substantial equilibrium for angular tilts required for comfort of the particular occupant of the chair. Also, by exerting a very small force, the occupant can cause the chair to rock to and fro. This is brought about primarily by the flexing or bending of the frame at each of the bends 9 and 12 and, secondarily, by flexing of the straight portions 10 between the sets of bends 9 and 12. The upwardly and rearwardly extending portion 10 flexes approximately about the center of the bends 9 so that the angle between the floor-engaging portion 8 and the upwardly and rearwardly extending portion 10 changes as the frame flexes. The center of the bend 12 thus moves in an arc of a circle centered at the bend 9. At the same time the angle at 12 is changing due to flexing of the portion 13 with respect to the portion 10. Superimposed upon this is a small flexing of the length 10. Thus, the back 19 and the seat 20 have a compound rocking or swaying motion imparted thereto.

Figure 5:
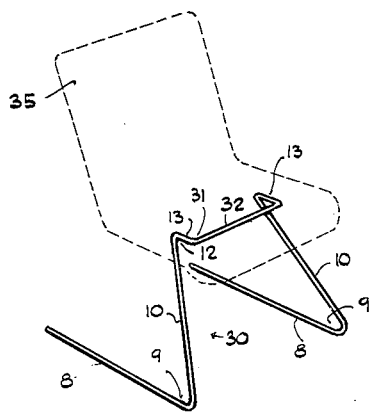
Fig. 5 is a perspective view of an alternate form of chair frame showing also, in dotted lines, the position of a conventional type of seat on the frame.

In Fig. 5 there is shown, diagrammatically, a modified form of chair frame 30. The frame includes a single continuous metal rod or tube bent symmetrically to form on each side of the frame a runner 8 which is bent at 9 to provide an upstanding length 10 that is then bent at 12 to provide a forward extending portion 13, as previously, and is then bent at 31 to provide a connecting length 32 which joins it to the opposite half of the frame that is bent in the same manner. The floor-engaging parts 8—8 are parallel to one another and are a distance apart slightly greater than the length 32 so that the parts 10—10 are slightly inclined toward one another from the floor upwardly. A side view of the frame 5 would be the same as that in Fig. 2, with the parts 14 and 16 omitted. The two forwardly extending portions 13—13 and their connecting portion 32 all lie in one plane and constitute a support to which is secured, in any desired manner, a unitary chair seat and back rest 35 which may be of a conventional construction. The resilient chair frames 30 of Fig. 5 may be stacked or nestled one within another for shipment, as may also, of course, the standard back rests 35.

Figure 6:
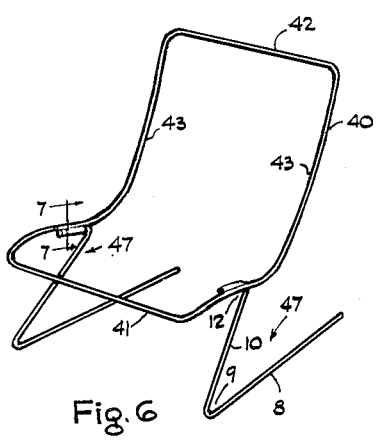
Fig. 6 is a perspective view of a chair frame illustrating still another embodiment of the present invention.
Figure 7:
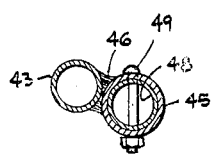
Fig. 7 is a fragmentary sectional view, taken along the line 7—7 of Fig. 6.

In Figs. 6 and 7 there is shown a chair frame comprising a conventional seat and back rest frame 40 formed of metal rod bent to the shape shown to provide a forward lower seat edge 41 and an upper rear back edge 42 and sides 43—43 which constitute an open structure by which a seat and back rest may be supported in any desired manner. For instance, a single sheet of canvas may be supported by the frame 40, as by passing around the edges 41 and 42 and, if desired, secured to the sides 43 by lacing, in a manner conventional in one type of chair. Each of the sides 43 has a short tube or socket 45 welded thereto as by a weld 46. Two similar supports 47 support the chair one at each of the sockets 45. Each support 47 includes a ground-engaging runner 8 bent at 9 to form the upright portion 10 and bent at 12 to provide a short length 48, as in the embodiment of Fig. 1. The length 48 telescopes into the socket 45 and is then locked in place as by a bolt 49 that extends through the socket 45 and through the length 48 and is held in place by a threaded nut. By removing the nuts and the bolts 49, one on each side of the frame 40, the supports 47 may be separated from the frame or from the chair to facilitate shipment or storage thereof. The locations of the bends 9 and 12 with respect to the seat portion of the seat and back rest frame portion 40 are the same as in the embodiment of Fig. 1 previously described. The longitudinal center lines of each of the two supports 47 lies in a vertical plane, as in the case of the analogous structure of Fig. 1, although they may be at an inclination to such a plane.

Figure 8:
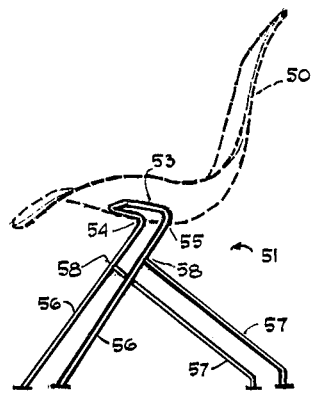
Fig. 8 is a perspective view illustrating another embodiment of the present invention.

In Fig. 8 I have shown a chair wherein a conventional molded or otherwise preformed seat and back rest 50 is secured in any desired manner upon a support 51 of the present invention. This support comprises a continuous rod bent to form a base 53 to which the chair is secured, from which base the rod is bent at 54 and 55 to provide two forwardly extending legs 56—56 to each of which is welded a rearwardly extending leg 57—57. The flexing or resiliency in this case is obtained primarily by flexing of the metal at the bends 54—55 between the base 53 and the legs 56 and, in addition, by flexing of the metal between the bends 54—55 and the junctions 58—58 where the rear legs 57 are joined to the forward legs 56.

Figure 9:
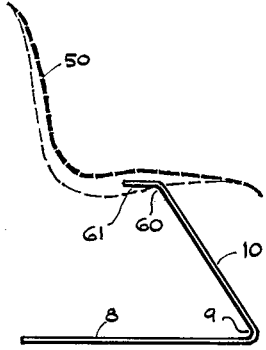
Figs. 9, 10 and 11 are, respectively, side views of still other embodiments of the present invention.

Fig. 9 is a side view of a chair frame similar to that of Fig. 5 but differing therefrom in that the upper part of the upwardly and rearwardly extending length 10 is bent rearwardly by a bend 60, which is an obtuse angled bend, to form a base 61, similar to the base of the frame of Fig. 5, for supporting the preformed seat and back rest 50. Each bend 60 is in a direction opposite to the direction of each bend 12 of Fig. 5. In other respects the seat supporting frame of Fig. 9 may be identical with that of Fig. 5.

Figure 10:
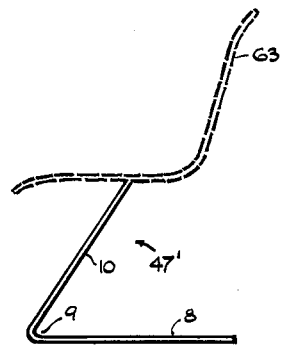

In Fig. 10 there is shown an embodiment similar to that of Fig. 6 except that the upper end of each of the two side supports or frames 47' that correspond to the support 47 of Fig. 6 is directly welded or otherwise secured to the side of a conventional seat and back rest 63. Here the entire flexing is produced at the bend 9 and by flexing of the upwardly extending portion 10. In other respects the bottoms 8 and sides 10 of the frame of this chair are the same as in the chair of Fig. 1 or Fig. 6 previously described and the location of the seat with respect to the support is also the same.

Figure 2:
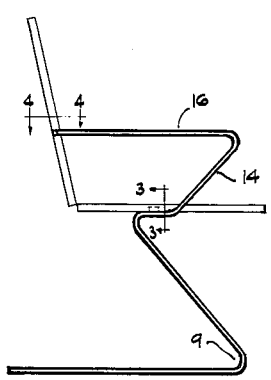
Fig. 2 is a side view of Fig. 1.
Figures 3, 4:
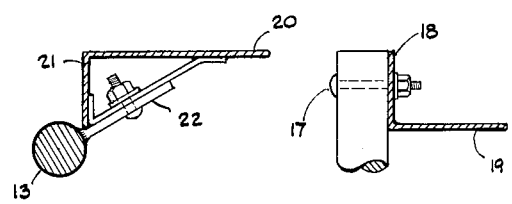
Fig. 3 is a fragmentary detail sectional view, taken along the line 3—3 of Fig. 2.
Fig. 4 is a fragmentary sectional view, taken along the line 4—4 of Fig. 2.
Figure 11:
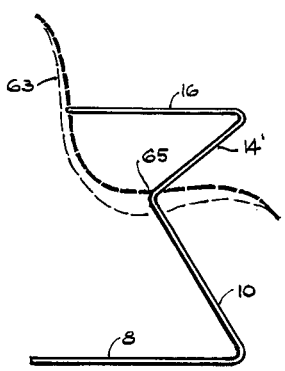

In Fig. 11 there is shown still another embodiment of the present invention wherein the seat and back structure 63, which may be conventional, is supported by a unitary frame similar to that of Figs. 1 and 2 but differing therefrom essentially only in that the bend 12 of Fig. 1 has been omitted, and the upwardly extending portion 10 that extends from the floor-engaging portion 8 to the seat and back 63 has a bend 65 therein from which it then extends upward and forward at 14' to the arm rest 16. The bend 65 and the end of the arm rest 16 may be secured to the side of the seat and back frame 63 in any desired manner, for instance, as described in connection with the embodiment of Fig. 1.

Reference may now be had more particularly to Figs. 12 through 19 that illustrate a folding chair embodying the principles of the present invention. The chair 70 here shown includes a folding resilient frame 71 on which is pivotally mounted a conventional seat 72 that includes a tubular peripheral seat supporting frame 73. The frame 71 includes two similar V-shaped legs 74 and an inverted U-shaped back rest support 75 having a back rest 75' secured between the arms 76 of the support. The legs 74 and the back rest support 75 are secured together in such a manner as to permit a very short relative longitudinal movement of the two and to permit an approximately 90° turning of the legs 74 axially with respect to the arms 76 of the back rest support. Each V-shaped leg is a resilient metal rod (or tube) bent to a V shape by an acute angle bend 78 to form the rearwardly extending floor-engaging runner 8 and to form the upwardly and rearwardly extending straight portion 10. Each straight portion 10 at its upper end supports a short tubular collar 80 (Fig. 17) which is rotatable with respect to the straight portion 10 and is held lengthwise against downward sliding thereon in any desired manner, as by a ring 81 that is locked to the straight portion 10. The collars 80 on the two V-shaped legs 74—74 are connected together by a cross bar 82 that may be welded to the two collars 80. A connecting tube 84 is welded or otherwise rigidly secured to the top of the straight portion 10 of each leg, coaxial therewith, and extends upwardly therefrom. The lower ends of the arms 76 telescope into the respective connecting tubes 84. The lower end of each arm 76 has an arcuate slot 86 therein that extends through an angle of approximately 90° in a plane at right angles to the longitudinal axis of the arm 76, and terminates in a short upwardly extending projection slot 87 at one end. A short pin 89 is secured to the connecting tube 84 and extends into the slot 86 or the projecting slot 87 and thus restricts the relative movement of the straight portion 10 of the leg with respect to the arm 76 to the limits determined by the slot 86 and the slot portion 87, which is a rotary movement of 90°, and at one end of the rotary movement a short axial movement.

Figure 17:
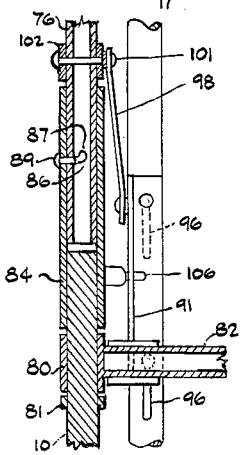
Fig. 17 is a sectional view, taken along the line 17—17 of Fig. 16, with the chair seat in its folded position.
Figure 18:
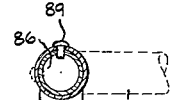
Fig. 18 is a sectional view, taken along the line 18—18 of Fig. 15, showing the folded position in dotted lines.
Figure 16:
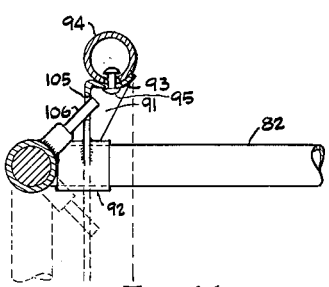
Fig. 16 is a sectional view, taken along the line 16—16 of Fig. 15, with the chair seat in its folded position and showing, in dotted lines, certain parts in their open position.
Figure 19:
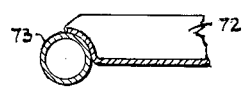
Fig. 19 is a fragmentary sectional view, taken along the line 19—19 of Fig. 12.

The cross bar 82 acts as a pivotal support for a gusset plate 91 rotatable on the cross bar as by means of a collar 92 to which the gusset plate is secured. The top of the gusset plate 91 is curved to form a cradle 93 for supporting the side 94 of the seat 72, said side resting in the cradle. There is a lost motion connection between the cradle 93 on the gusset plate and the side 94 of the seat frame, the lost motion connection being such as to permit the seat frame a limited amount of movement on the cradle of the gusset in a direction axial of the side 94. This lost motion connection consists of two pins 95 each of which extends through the cradle 93 and into the side 94 being secured to one of them and entering into a slot 96 in the other. In this instance the slots 96 are in the sides 94. A link 98 pivotally connects each side 94 at a pivot 99 with the arms 76, as by a pivot pin 101. The pivot pin 101 extends through the link 98 and a collar 102 and the arm 76. When the mechanism is in its chair folded position, as illustrated in Fig. 17, the bottom of the collar 102 is above the connecting tube 84 by an amount that the arm 76 can drop into the connecting tube 84 as limited by the projecting slot 87.

The gusset plate 91 has a shaped hole 105 therein into which extends a pin or rod 106 that is rigidly secured to the connecting tube 84. A rotary turning movement of the gusset plate 91 about the cross bar 82 will cause the edge of the slot 105 to move the pin 106 and with it the connecting tube 84 in a rotary direction centered at the center of the tube 84 which is coaxial with the center of the straight portion 10 of the associated leg and with the longitudinal center of the associated arm 76.

Figure 13:
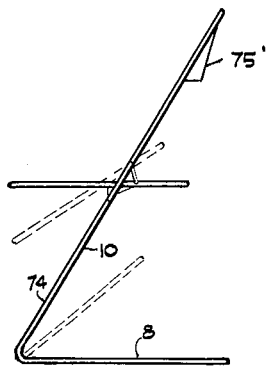
Fig. 13 is a side view of the chair of Fig. 12 and illustrating, in dotted lines, a partially folded position.
Figure 15:
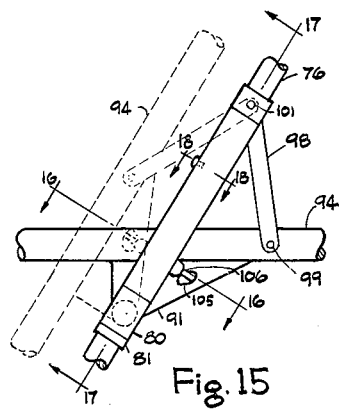
Fig. 15 is an enlarged side view of the hinge mechanism of the chair of Fig. 13, and showing, in dotted lines, certain parts in their folded position.
Figure 14:
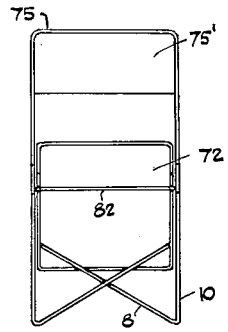
Fig. 14 is a rear view of the chair of Fig. 13 in its fully folded position.

When the seat 72 is in its horizontal or extended position it is supported by the two gusset plates 91—91 and their associated links 98 on opposite sides of the chair. This is the position illustrated in Fig. 15. To collapse the chair the operator pulls the seat frame 94 forwardly, that is, in a direction to the left as seen in Figs. 13 and 15. The seat slides on the gusset plates 91 to the limits permitted by the slots 96. At the same time the pivot pin 99 between the link 98 and the seat frame 94 moves to the left to a position bringing the link 98 at right angles to the side 94 in Fig. 15 and therefore pushes the pin 101 and the arm 76 upwardly. This raises the back rest frame 75 an amount to bring the two arms 76 into such a position that the pin 89 in the arcuate slot 86 moves from its locked position at 87. At the same time a downward force is manually exerted on the forward end of the seat frame. This downward force now causes the seat to turn and to turn the gusset plates 91 on the cross bar 82. In so doing each gusset plate turns its pin 106 and thereby turns the leg 74 about the longitudinal axis of the arm 76. This continues until each leg 74 has been turned through an angle approximately 90°. At the same time the tubular seat frame 94 moves from its horizontal position illustrated in full lines in Fig. 15 to an inclined position parallel to the frame 75, as illustrated in dotted lines in Fig. 15. In this folded position the seat is in a position parallel to and slightly forward of the back rest and the floor-engaging runners 8 are in a position illustrated in Fig. 14 wherein they cross one another and terminate in the space between the back of the seat and the plane determined by the longitudinal axes of the two straight portions 10 and the two arms 76.

When the collapsed chair is opened the reverse action takes place. The lower front edge of the seat is first pivoted upwardly about the longitudinal axis of the cross bar 82 as a center, thus bringing the legs to the positions illustrated in full lines in Figs. 12 and 13, and then the seat is pushed back slightly on the gusset plates to the limits permitted by the slots 96, which brings the arms 76 downwardly to the open position as permitted by the pin 89 entering the projection slot portion 87. At this time the collar 102 rests on the top of the connecting tube 84.

Figure 12:
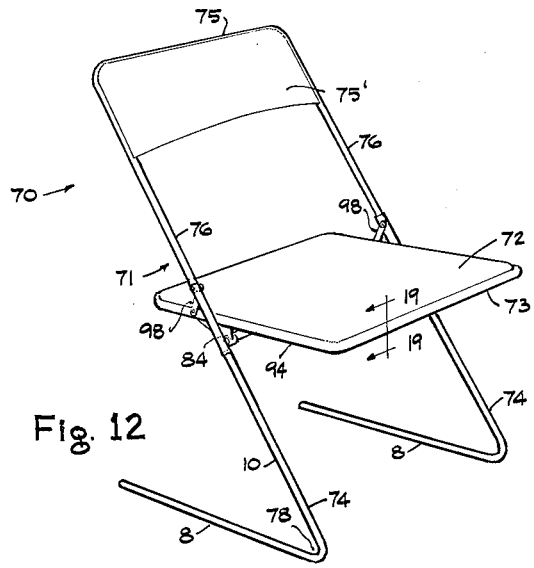
Fig. 12 is a perspective view of a folding chair embodying the present invention.

The chair of Figs. 12 and 13 affords all of the advantages of a folding "bridge type" chair together with the advantages of a rocking type chair in that the V-shaped legs 74 are adapted to flex at the bend 78 and, in addition, there is some flexing of the straight portion 10 of the leg 74. Insofar as concerns the flexing function to produce the rocking action, the arms 76 act as a continuation of the straight portions 10 so that leverage exerted by the occupant of the chair against the back rest 75 is transmitted through the coupling between the arms 76 to the straight portions 10. The occupant of the chair of Fig. 12 can impart thereto a rocking motion the same as in the case of the chairs previously described.

Reference may now be had more particularly to the embodiment of the invention illustrated in Figs. 20 through 24. In this construction there is shown a chair 120 including an inverted U-shaped back rest frame 121 each arm 122 of which is pivotally connected to the end of an arm of a U-shaped seat frame 123. The two frames are of metal rod or tube stock the ends of which are flattened to facilitate the pivotal connection by means including a tie rod 124. The seat support includes two folding resilient legs 74—74 of a construction such as previously described and having at their upper ends the folding mechanisms as previously described, each including a connecting tube 84 from which extends a tube or rod 76' that is connected to the connecting tube 84 in the same manner as are the arms 76 in the embodiment previously described. The two connecting tubes 84—84 on opposite sides of the chair 120 are connected by a cross bar 82 which in turn supports a gusset plate 91 that supports the seat frame 123 by means including a link 98 connecting the seat frame 123 with the rod 76', all in the same manner as in the chair of Figs. 12 through 19. The upper end of each of the rods 76' is connected by a pin assembly to an arm rest 126 that is pivoted at its rear at 128 to an arm 122 of the back rest frame 121. The folding and unfolding of this chair frame is the same as in the case of the chair of Figs. 12 through 18 previously set forth.

Figure 20:
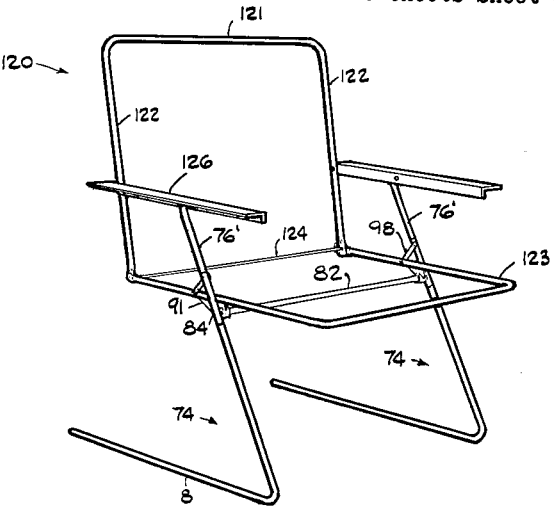
Fig. 20 is a perspective view of another type of folding chair frame.
Figure 21:
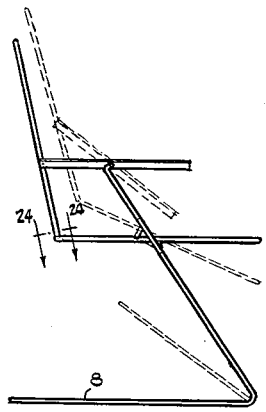
Fig. 21 is a side view view of the frame of Fig. 20 showing, in dotted lines, the same in its partially folded position.
Figures 22, 23:
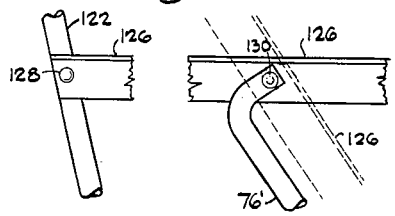
Fig. 22 is an enlarged fragmentary side view of the joint between the arm rest and back frame of Fig. 21.
Fig. 23 is an enlarged side view of the connection between the support and the arm rest of the frame of Fig. 21 and showing, in dotted lines, the arm rest in its folded position.
Figure 25:
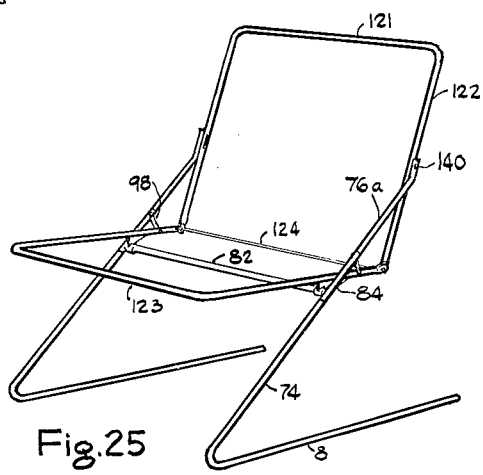
Fig. 25 is a perspective view of a folding chair frame illustrating another embodiment of the present invention.
Figure 24:
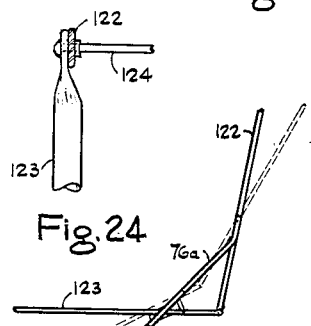
Fig. 24 is an enlarged sectional view, taken along the line 24—24 of Fig. 21.
Figure 26:
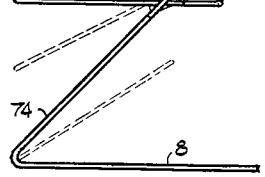
Fig. 26 is a side view of the frame of Fig. 25 showing, in dotted lines, the frame in its partially folded position.
Figure 27:
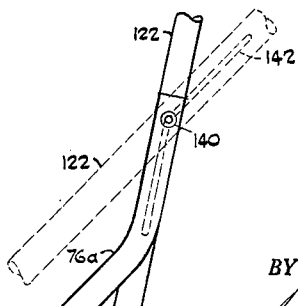
Fig. 27 is an enlarged fragmentary side view of the junction between the support and the back rest frame of the chair frame of Fig. 25.

In Figs. 25 through 27 there is shown a modification of the chair of Figs. 20 through 23, which modification consists essentially in that the arm rests of Fig. 20 have been omitted while retaining the pivotal connection between the seat frame and the back rest frame. In this instance, the pivotal connection between the seat frame 123 and the folding resilient supporting legs 74 is identical with that previously described. A rod 76a that corresponds with the rod 76 of the chair of Fig. 12 or 76' of Fig. 20 extends into the connecting tube 84 and is connected thereto and to the seat frame 123 in the same manner as each arm 76 is connected in the chair of Fig. 12. The upper end of each rod 76a is pivotally connected to the adjacent arm 122 of the back rest frame 121 by a pin and slot connection wherein a pin 140 extends through the end of the rod 76a and into a slot 142 in the arm 122 of the frame 121. The folding operation in this instance is identical with that of the chair of Fig. 12.

Figs. 28 through 31 show the principles of the chair of Figs. 12 through 19 as applied to a folding chair of the type wherein the seat comprises a strip of canvas 150 stretched between the sides of the rectangular seat frame 73 and wherein the back rest consists of a strip of canvas 152 stretched between the top of the U-shaped back rest support 75 and the rear end of the rectangular seat frame 73. In view of the fact that the canvas seat is intended to have a certain amount of permissive sag, the cross bar 82 of the chair of Fig. 12 has been omitted and therefore the gusset plate 91', which corresponds to the gusset plate 91, has been pivoted directly by a pivot pin 156 to 84' which includes 84, 80 and 81 of Figs. 15 and 17 rigidly joined to the straight portion 10. The center of the pin 156 is in alignment with the center of the corresponding pin 156 at the opposite side of the chair, the centers of these two pins being coincident with the center of the cross bar 82 in the chair of Fig. 12. In other respects this chair may be the same as the chair of Fig. 12. The folding and unfolding operations of this chair are the same as the chair of Fig. 12.

Figs. 32 and 33 show a chair similar to that of Figs. 28 through 31 except that the seat frame 73', which corresponds to the frame 73, is U-shaped instead of rectangular and that the combined seat and back rest consists of a single sheet of canvas or the like 160 that is secured at its upper end to the top of the frame 75 and at its lower end along the forward edge of the seat frame 94'.

Reference may now be had more particularly to the chair illustrated in Figs. 34 through 39. In this chair each of the two side legs 74 is connected to the arms 76 of the back rest support 75, and to the seat frame of the chair, by a folding mechanism somewhat different from that previously described. In this instance, the lower end of each arm 76 of the back rest 75 has a straight longitudinal slot 170 and fits into and is rotatable within a sleeve 171. The upper end 172 of the sleeve 171 is forced at its periphery into a peripheral groove in the tubular arm 176 to hold the sleeve against retraction from the arm but permit relative turning of the two. The sleeve 171 has a lengthwise extending slot 174 therein the uppermost portion 175 of which is coaxial with the longitudinal axis of the sleeve for a short distance and thereafter the slot 174 has a helical twist through approximately 90° of the circumference of the sleeve 171 for a purpose that will be apparent as this description proceeds. The arm 76 is pivotally connected to a link 178 as by a pivot pin 179. The lower end of the link 178 is pivoted as by a pin 180 to the side of the chair seat 181. The chair seat 181 is supported on each side, adjacent the rear thereof, by two links 178 and rests forwardly of the links on a cross bar 183 one end of which has a socket 184 which encircles the sleeve 171 on one side of the chair and the other end of which has a similar socket which similarly encircles the sleeve 171 of the folding mechanism on the opposite side of the chair. Each sleeve 171 is rotatable in its socket 184. The cross bar 183 is held against movement lengthwise on the sleeves 171 in any desired manner as, for instance, by having an upper outwardly extending peripheral protuberance 186 formed in the sleeve 171 immediately above the cross bar and a collar at the lower end of the sleeve supporting the socket 184, although, obviously, any other convenient means may be used to secure the cross bar against retraction on each of the two sleeves 171.

Each side of the chair seat frame 181 is additionally connected to the folding mechanism by a lug 188 one end of which passes through a slot 189 that extends lengthwise in the side of the chair seat frame, the lug being free to slide in the slot 189 but being irretractable therefrom except by loosening of a nut as shown. The opposite end 190 of the lug 188 extends through the 90° helical slot 174 in the sleeve 171 and through the vertical slot 170 in the arm 76 of the back rest frame. This completes the connection between the folding mechanism and the seat of the chair.

The respective folding resilient supporting frames 74 extend into the associated sleeves 171 and are locked thereto against relative turning and also against relative axial movement, so that the supporting frames turn only with their associated sleeves 171.

To fold the chair of Fig. 35 the top of the back rest is gripped by one hand and the forward end of the seat frame 181 is gripped by the other hand and pulled forwardly and upwardly. This causes the link 178 to swing in a direction clockwise as seen in Figs. 35 and 37, the seat frame 181 pivoting clockwise about the pivot 180, which pivot is at the same time moving to the left as seen in Fig. 37 within the limits imposed by the slots 189. When the seat frame 181 has been moved a distance such that the right hand end of the slot 189 abuts against the lug 188, further upward turning of the seat frame carries the lug 188 upwardly, the end 190 of this lug riding upwardly in the straight slot 170. Since the end 190 of the lug also extends through the helical slot 174, it follows that the upward movement of the lug acting upon the walls of the slot 174 will cause the sleeve 171 to turn. The length and pitch of the slot 174 is such that the sleeve 171 is turning through an angle of approximately 90° as the seat frame 181 is moved to its fully folded position, in which position the seat frame lies in the plane of the arms 76 and projects upwardly from the pivot pin 180.

In each of the folding chairs above described there is provided a structure that permits a rocking action obtained by the flexing of the metal of the supporting legs at the bend between the supporting leg and the floor-engaging runner and, in addition, the rocking action that is obtained by the flexing of the straight rearwardly and upwardly extending portion of each supporting leg. The folding mechanism of the chair of Fig. 34, as shown more particularly in Figs. 37, 38 and 39, can be incorporated in chairs embodying the frames such as shown in Figs. 20, 25, 28 and 32 in lieu of the folding mechanisms there shown. Furthermore, in each of the folding chairs here shown there is provided a positive mechanical connection for swinging the floor-engaging runners of the folding legs to and from their folded positions in response to the corresponding swinging of the chair seat. It is within the purview of the present invention to omit this positive connection so that the swinging of the chair seat to its unfolded position and the locking thereof in that position, and the swinging of the respective floor-engaging runners of the legs between their folded and unfolded positions and the locking thereof in their unfolded position are independent manual operations. Such a chair permits the stacking of chairs by merely swinging the seat to its folded position so that a large number of such chairs can thereby be stacked in a small space, if necessary.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A folding chair including seat and back rest frames pivotally connected together, a pair of side legs each having a ground-engaging portion extending fore and aft of the chair and having a smooth curve at one end merging with an upwardly extending portion, the longitudinal axes of the upwardly extending portions being spaced apart and defining one plane, each said upwardly extending portion at the upper end thereof being connected to the back rest frame and each being rotatable about its longitudinal axis to move the ground-engaging portions toward said plane to a folded position approximately paralleling said plane, said seat frame being movable from an unfolded position at a substantial angle to said plane to a folded position substantially paralleling said plane, and means for rotating said upwardly extending portions about their longitudinal axes to bring the ground-engaging portions to their folded positions in response to movement of the seat to its folded position.

2. A folding chair including seat and back rest frames pivotally connected together, a pair of side legs each having a ground-engaging portion extending fore and aft of the chair and having a smooth curve at one end merging with an upwardly extending portion, the longitudinal axes of the upwardly extending portions being spaced apart and defining one plane, each said upwardly extending portion at the upper end thereof being connected to the back rest frame and each being rotatable about its longitudinal axis to move the ground-engaging portions toward said plane to a folded position approximately paralleling said plane, said seat frame being movable from an unfolded position at a substantial angle to said plane to a folded position substantially paralleling said plane, means for rotating said upwardly extending portions about their longitudinal axes to bring the ground-engaging portions to their folded positions in response to movement of the seat to its folded position, said last named means including a lost motion connection between the seat frame and upwardly extending portions to permit movement of the seat frame to a locked position after movement thereof to its unfolded position.

References Cited in the file of this patent

UNITED STATES PATENTS

| | | |
|---|---|---|
| 1,698,697 | Hageman | Jan. 8, 1929 |
| 1,976,031 | Lowenberg | Oct. 9, 1934 |
| 2,027,125 | Stoll | Jan. 7, 1936 |
| 2,098,888 | Schadler | Nov. 9, 1937 |
| 2,606,597 | Carlson | Aug. 12, 1952 |

FOREIGN PATENTS

| | | |
|---|---|---|
| 689,756 | France | Feb. 12, 1930 |
| 374,413 | Great Britain | Dec. 5, 1930 |
| 290,885 | Italy | Dec. 3, 1931 |
| 374,885 | Great Britain | Jan. 7, 1932 |
| 407,221 | Great Britain | Mar. 15, 1934 |
| 167,760 | Switzerland | May 16, 1934 |
| 535,252 | Great Britain | Apr. 3, 1941 |
| 619,027 | Great Britain | Mar. 2, 1949 |
| 870,738 | Germany | July 8, 1949 |